Figure 1:
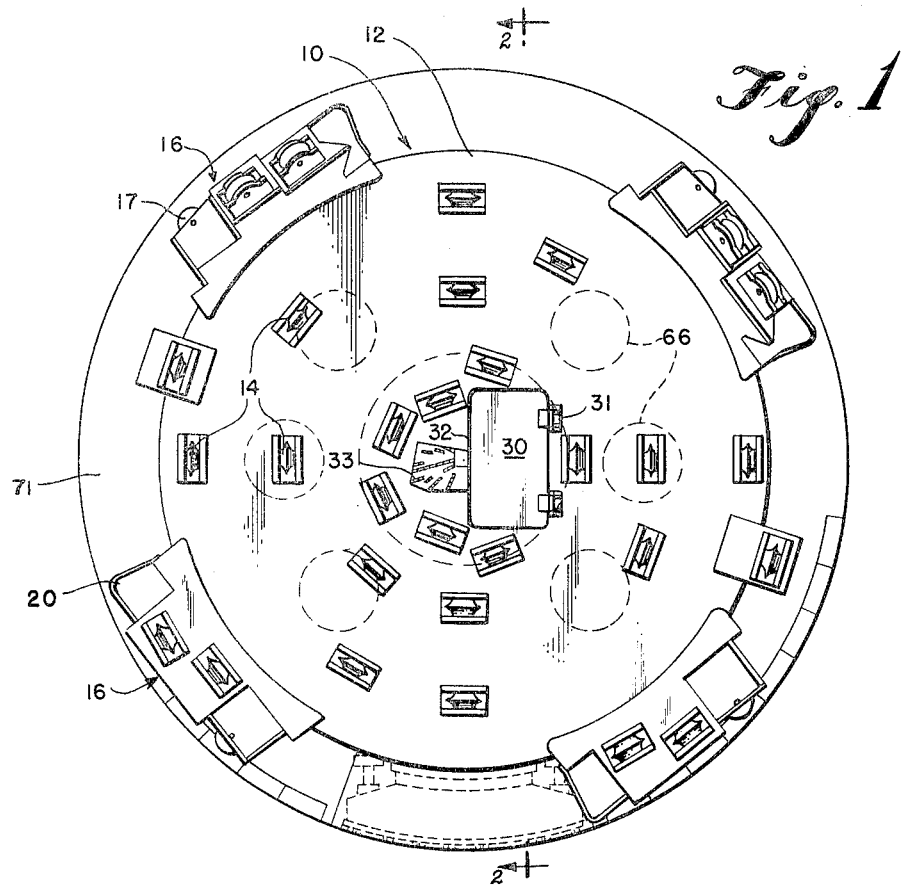

March 1, 1966 R. J. ROBBINS ETAL 3,237,990
HEAD STRUCTURE FOR ROCK DRILLING MACHINE
Filed June 20, 1962 2 Sheets-Sheet 1

RICHARD J. ROBBINS
DOUGLAS F. WINBERG
INVENTORS

BY Barnes & Seed

ATTORNEYS

March 1, 1966  R. J. ROBBINS ETAL  3,237,990
HEAD STRUCTURE FOR ROCK DRILLING MACHINE
Filed June 20, 1962  2 Sheets-Sheet 2
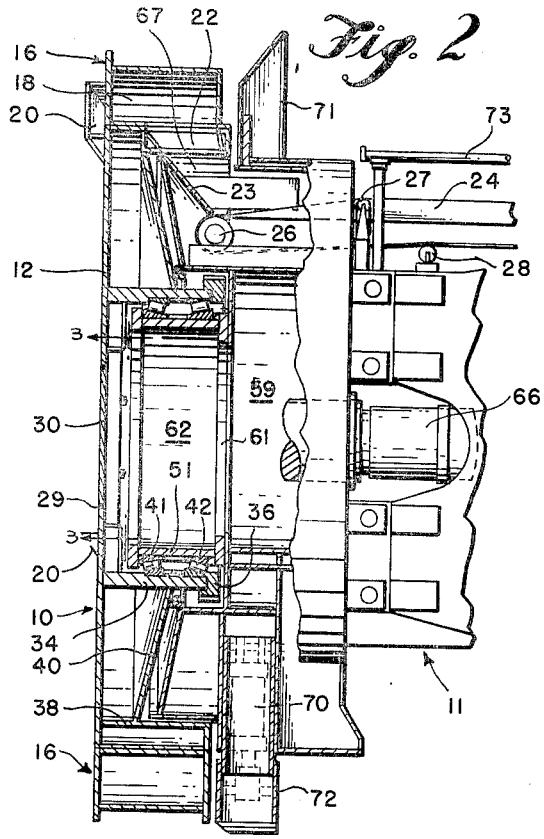
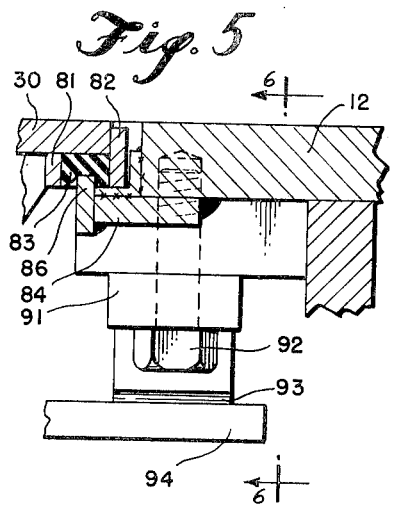
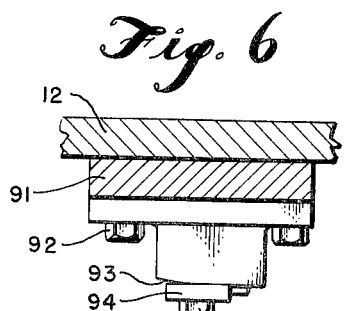
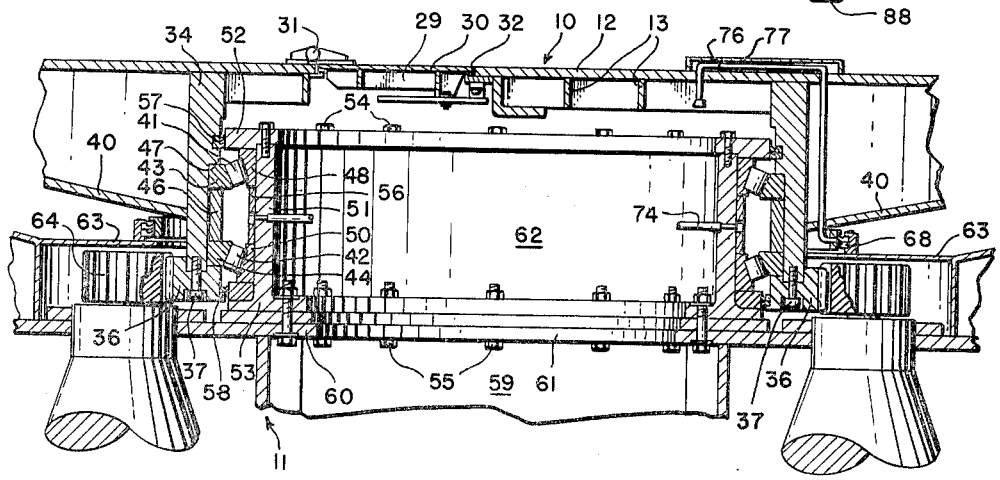
INVENTORS.
RICHARD J. ROBBINS
DOUGLAS F. WINBERG
BY Barnes & Seed
ATTORNEYS United States Patent Office 3,237,990
Patented Mar. 1, 1966

3,237,990
HEAD STRUCTURE FOR ROCK DRILLING MACHINE
Richard J. Robbins, Seattle, and Douglas F. Winberg, Bellevue, Wash., assignors to James S. Robbins & Associates, Inc., Seattle, Wash., a corporation of Washington
Filed June 20, 1962, Ser. No. 203,846
10 Claims. (Cl. 299—56)

The invention relates generally to a boring machine, and more particularly to that type of machine which bores tunnels of a relatively large diameter in a manner such that the machine itself travels progressively into the ground strata being bored as its large rotary head cuts a passage in the rock. Clarity in an understanding of the invention will be advanced by here cursorily considering the general nature of a boring machine of the type to which the present invention pertains.

This machine provides a relatively large body portion (only the extreme forward portion of which is shown herein) having a diameter moderately less than the tunnel which is to be bored, and desirably has a length greater than its diameter. The front of the body carries a large rotary head which performs the rock-cutting function, and by means of scoops on the periphery of the head transfers the resulting debris to the upper part of the machine. Here a conveyor carries the debris to the rear of the machine.

Mounted on the front or working face of the cutting head are a plurality of freely rotating cutters. Each of these has a circumferential cutting edge, and the axis of rotation of each cutter passes through the axis of rotation of the head. Thus, as the machine pushes forward from its shoe mounts, the cutters bear against the end face of the tunnel, and, by virtue of the rotary motion of the head, roll against the rock so as to cut a plurality of circular kerfs in the rock face. As each cutter deepens its kerf by chipping away the adjacent rock, larger pieces of rock between proximate kerfs are caused to be broken away, moved by the scoops to the conveyor, and carried with the other debris to the rear of the machine in the aforedescribed manner.

Obviously, with a fairly large number of cutters being used, and with the rather strong forward thrust required to cause even one such cutter to make its kerf, the total forward thrust exerted by the head is of considerable magnitude. Also, since the rock even in a localized area can vary greatly in its resistance to the action of the cutters, this thrust is very often unbalanced, so that a considerable torque is exerted on the head about a transverse axis passing through the center axis of the head. Further, since some of the rock may be stratified or otherwise formed so as to have a resistance to cutting which is greater along one axis than another, there may be an unbalanced lateral or vertical force on the head.

From this it can be seen that one of the problems to be solved in devising this machine or any machine of this general nature is that of constructing the same with sufficient ruggedness and durability to withstand such loads. Also there is the problem of maintaining the machine in its tunnel location, and especially of maintaining the cutters. The latter function requires that there be an access route to the front or working face of the head so that a mechanic may periodically inspect the cutters and replace any that are damaged or excessively worn. In prior art machines of this general nature, this access route is along the outside of the machine, with the mechanic having to crawl around the outside edge of the cutting head to reach the cutters. Aside from the inconvenience of traveling such a route, there is the disadvantage that in some types of rock a considerable amount of dust is generated by the cutting action. If a maintenance access route is provided along the side of the machine it precludes the provision of an effective dust shield at the front. Yet in placing the access route in any other location, there is the problem of devising a machine which permits of such a route without detracting from the machine's ability to properly perform its boring function.

It is with the foregoing problems in mind that the structure of the present machine has been contrived and it is the general object of the invention described herein to create a machine which is arranged with sufficient ruggedness and durability that it will effectively accomplish the aforedescribed boring function, which provides convenient access for maintenance of the machine, and especially for maintenance of the cutter heads, and which is arranged to keep the tunnel as free of dust as possible.

Other more particular objects and advantages will, together with the general object appear and be understood in the course of the following description and claims, the invention consisting in the novel construction and in the adaptation and combination of parts hereinafter described and claimed.

Figure 3:
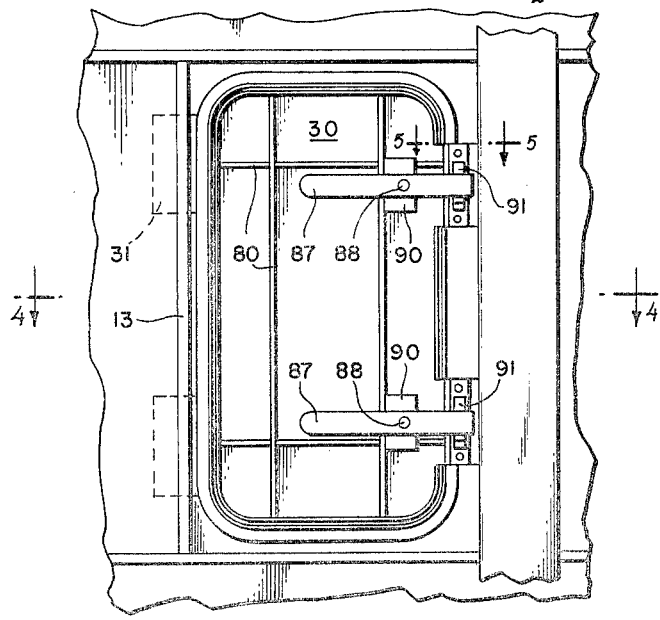

In the accompanying drawings:
FIGURE 1 is a front elevational view of a head portion of a machine embodying preferred teachings of my invention.
FIG. 2 is a fragmentary longitudinal sectional view taken on line 2—2 of FIG. 1 and showing the head and forward body portion of my invention.
FIG. 3 is a fragmentary sectional view taken on line 3—3 of FIG. 2, and drawn to an enlarged scale.
FIG. 4 is a reduced-scale fragmentary horizontal sectional view taken on line 4—4 of FIG. 3.
FIG. 5 is a fragmentary horizontal sectional view drawn to an enlarged scale on line 5—5 of FIG. 3; and
FIG. 6 is a fragmentary longitudinal vertical sectional view drawn to a reduced scale on line 6—6 of FIG. 5.

Referring to the accompanying drawings, numeral 10 designates a head member which is mounted for rotary motion about a longitudinal axis on the front portion of the main frame or body 11 of the machine. In both FIGS. 2 and 4 all of the parts of such rotating head assembly which appear in section have their hatch lines sloping downwardly to the right, while for the non-rotating body of the machine all sectioned parts have their hatch lines sloped downwardly to the left.

The head comprises a face plate 12, which on its back side is braced with vertical and horizontal reinforcing ribs 13 integral therewith, and which has mounted on its front surface a plurality of freely rotating cutters 14 of the type hereinbefore described. (For simplicity of illustration the cutters are omitted in FIGS. 2 and 4.) Welded or otherwise secured to the head at equidistantly spaced intervals about the periphery thereof are four outrigger members 16 on which are mounted gauge cutters 17 (see FIG. 1). Each of these outrigger members 16 has a bucket-like configuration, with the mouth 18 of each bucket being on the clockwise side thereof as viewed from the front. A related one of four protruding scoops 20 extends in a clockwise direction forwardly beyond the front face of each outrigger member, albeit to a distance appreciably less than the projection of the cutters. As the scoops of the rotating head pass along the floor of the tunnel being dug, the same act to gather into the mouth 18 the debris created by the action of the cutters on the rock.

Each scoop feeds to the interior of the related bucket, and the mouths 18 of said buckets lead to passageways 22 so formed and positioned that when any one of said buckets reaches its upper limit of travel, the debris discharges down a rearwardly sloping chute member 23 onto the upper run of an endless conveyor 24. This conveyor trains over a front roller 26, with said upper run moving rearwardly to carry the debris deposited thereon to the rear of the machine. The conveyor is suitably supported along its upper run by a number of guide rollers, two of which are shown at 27 and 28.

The face plate 12 of my invention is particularly characterized in that it has at its center portion a doorway 29 to provide convenient access to the working surface of the face plate, this doorway being normally closed by a door 30. The door is hinged to the face plate at 31, and the edge of the doorway opposite the hinges lies on or proximate to a diameter of the face plate, the door thus being eccentric with respect to the rotary axis of the head 10. Rigidly secured to the center portion of the face plate adjacent the inner door edge 32, are a plurality of forwardly extending carbide cutters 33 (FIG. 1). These cutters do not have the kerf cutting action of the rotary cutters 14, but rather abrade or scrape out the rock which they contact. In the machine shown herein, there are no cutters mounted on the door. However, for some operations, it has been found desirable to arrange the cutters in a pattern such that one or more cutters are mounted on the door. The door 30 will be described more particularly hereinafter, but at this point it is sufficient to indicate that it swings outwardly, and is a type of watertight door commonly found aboard ocean-going vessels.

Rigidly secured to, and extending rearwardly from, the face plate 12 is a cylindrically shaped ring member 34 having a diameter moderately less than that of the head 10, but greater than the largest dimension of the door 30. The center axis of this ring coincides with the rotary axis of the head 10. This ring provides support for the entire head assembly and is also the member through which drive is transmitted to rotate the head, both these functions requiring that the ring be of heavy metal construction. This drive function is accomplished through an annular bull gear 36, which is bolted at 37 in surrounding relation to the ring 34 at the rear extremity of the latter. (The manner in which this gear cooperates with the drive means mounted on the body of the machine will be described more fully hereinafter.) The peripheral portion of the face plate 12 is braced from the ring 34 by means of a cylindrical plate 38, which extends rearwardly from the face plate, and is joined to an inwardly reaching cone-plate 40 welded at its inner edge to the approximate mid-circumference of the ring 34.

Front and rear roller bearings 41 and 42 provide a journal mounting for the head. Outer races 43 and 44, respectively, of said bearings have their bearing surfaces oppositely flared, thus compensating the head to the substantial thrust loads exerted thereon as well as giving radial bearing support. Such outer races are separated by a spacer 46 and are held by the bull gear between a forwardly facing shoulder of the latter and a rearwardly facing shoulder 47 of the head-carried ring 34.

The inner races 48 and 50 for such thrust and journal bearings 41 and 42 surround a neck or ring member 51 rigidly secured to the front of the body 11, and with a separating spacer sleeve 56 are retained between a rear annular flange 53 integral with the neck and a front flange 52 bolted at 54 to the neck. Seals 57 and 58 are provided at the two ends of the cavity occupied by said bearings.

The rear flange 53 is bolted at 55 to a transverse structural plate 60 of the body. In this plate is a centrally placed circular opening 61 having a diameter only moderately smaller than the throat 62 which is defined within the neck, such throat and the opening 61 giving access to the doorway, or man-hole as it may be hereinafter termed, of the face plate 12 from a center passageway 59 extending the length of the body 11.

Secured to the front face of the structural body plate 60 and extending circumferentially about the rear portion of the ring 34 is a housing structure 63 in which are located six drive pinions 64 meshing the teeth of the bull gear 36. Each of these pinions is turned by a related one of six electric motors 66 which are mounted along the side portions of the body 11. Housing 63 provides an opening at the top through which debris is free to fall onto the chute 23 from each of the outrigger buckets 16, successively in turn as each works to a position at the top of the head. A circumferential seal 68 is provided between the ring 34 and the housing 63 to prevent settling dust and small particles of rock from working inwardly to the teeth of the bull gear and the pinions.

To steer the machine, there is provided at the front of the body 11 one downwardly extending hydraulic jack, shown schematically at 70, and two laterally extending hydraulic jacks (not shown) which are located at the approximate mid-height of the body 11. Secured to the body 11 on the same transverse plane as the hydraulic jacks is a dust shield 71 which extends circumferentially about the body 11 excepting for accommodating mutilations at the three locations occupied by said three jacks. The diameter of this dust shield is very nearly the same as that of the tunnel being bored, and its interfit with the jack casings 72 is sufficiently close to prevent any appreciable amount of dust from passing beyond the shield into the tunnel portion behind the body 11. A longitudinally extending set of rails 73 is or may be mounted on the body 11 above the conveyor 23 to move certain equipment along the length of the machine.

Lubricant is supplied to the cavity for said bearings 41 and 42 through tubes 74 (see FIG. 4) which are accessible from within the throat 62. Also accessible from within this throat is a tube 76 for feeding lubricant to the seal 68. Such tube 76 rotates with the rotary head and as here shown is exposed in part beyond the face plate 12 of such head. A cover plate 77 shields this exposed portion.

The door 30 is braced by vertical and horizontal stiffening webs 80 running along the back surface thereof. Extending about the perimeter of the door are two spaced flanges 81 and 82 which form a rearwardly facing channel. When the door is in closed position a forwardly projecting tongue 86 made integral with a lip 84 which extends circumferentially about the rim of the man-hole enters said channel and presses against a rubber sealing strip 83 which seats therein.

Carried by the door on its inner side, each being pivoted at 88 to a respective mounting block 90 so as to swing in a plane paralleling the plane of the door, are two hand levers 87. Outer ends of the levers each engage a related catch-block 91 bolted at 92 to the rear face of the plate 12 adjacent the man-hole's inner edge 32. Lead-in surfaces 93 of the catch-blocks are bevelled.

In operation the six drive pinions 64, powered by their respective electric motors and each meshing the bull gear, cause the head to rotate. As the entire machine inches forwardly in course of a boring operation the freely rotating cutters 14 bore into the rock by forming kerfs therein and fracturing the rock which lies between the kerfs. When it becomes desirable to perform maintenance work on the cutters 14, the machine is backed off a short distance from the working face of the tunnel, and a mechanic then moves through the center passageway 59 of the machine into the throat 62, and upon opening door 30 can pass through the man-hole to the front face of the machine. The machine is supplied with tools or parts from a helper who remains in the throat. By providing this route through the interior of the machine it becomes unnecessary for an individual servicing the machine to go between the outside of the machine and the tunnel wall. By placing the door in a position offset laterally from the rotary axis of the head, one result is that the mechanic, should he wish to sit (or with large-diameter heads stand) upon a lower edge of the man-hole, the head can be turned in the degree necessary to provide a most convenient working condition. Another and important advantage is that center cutters necessary to perform an effective boring action can be mounted directly from the face plate rather than the door.

It is thought that the invention will have been clearly understood from the foregoing detailed description. Changes will suggest themselves and may be resorted to without departing from the spirit of the invention, wherefore it is my intention that no limitations be implied and that the hereto annexed claims be given a scope fully commensurate with the broadest interpretation to which the employed language admits.

What we claim is:

1. A machine to bore a tunnel of substantial diameter into a ground strata, the machine itself being adapted to travel progressively into the ground strata being bored as it cuts a passage therein, said machine comprising:
   (a) a body portion having means by which the same is supported in said tunnel,
   (b) a head journal-mounted at the front of said body for rotary motion about a longitudinal axis,
   (c) cutting means carried by said head upon the front face thereof, the rotary motion of said head enabling said cutting means to bore into the ground strata in which the tunnel is being formed, said cutting means requiring periodic maintenance,
   (d) a ring member rigidly secured to the head to occupy a position concentric to the rotary axis of the head,
   (e) said body having bearing means engaging said ring member to produce the rotary journal for the head,
   (f) drive means mounted on said body and operatively engaging said head for rotating the head,
   (g) an opening in the front face of said head, and
   (h) a door for closing said opening, said door being located within the limits of said ring member, so that an access passage to the front face of said head for the maintenance of said cutting means is provided through said ring and said door.

2. The machine recited in claim 1, said drive means comprising a bull gear rigidly secured to said ring in surrounding relation to the access passage, and power-driven pinions carried by the body and meshing the teeth of the bull gear.

3. The machine recited in claim 1, the bearing means comprising inner and outer races, one secured to the ring and the other to the body, and rollers received between and engaging said inner and outer races.

4. The machine recited in claim 1 in which said door is placed eccentric to the rotary axis of the head, in a manner such that cutting means may be mounted on the head in an area thereof lying between the head's center of rotation and a point spaced radially therefrom a distance equal to the radial distance of the door.

5. The machine recited in claim 1, said door being provided with means on the rear thereof by which the door may be opened or held shut, and having a peripheral seal which is made tight by virtue of pressure exerted by said holding means.

6. The machine recited in claim 1, and having about the outer portion of said machine a dust shield serving to substantially block a passage between the machine and the tunnel wall so that dust generated by the action of the cutting means is confined to the front portion of the tunnel.

7. A machine to bore a tunnel of substantial diameter into a ground strata, the machine itself being adapted to travel progressively into the ground strata being bored as it cuts a passage therein, said machine comprising:
   (a) a body portion having means by which the same is supported in said tunnel,
   (b) a head journal-mounted at the front of said body for rotary motion about a longitudinal axis,
   (c) cutting means carried by said head upon the front face thereof, the rotary motion of said head enabling said cutting means to bore into the ground strata in which the tunnel is being formed, said cutting means requiring periodic maintenance,
   (d) buckets mounted on the periphery of said head, the rotation of the head causing said buckets to carry debris loosened by said cutting means to the top portion of said machine,
   (e) a conveyor at the top of said machine acting to receive debris from said buckets and carry said debris to the rear of said machine,
   (f) means presented by the body and by the head having bearing engagement to provide said journal mounting for the head,
   (g) a large-diameter bull gear secured to said body concentric to the rotary axis of the head and having an opening central thereto of a size permitting an individual to pass therethrough,
   (h) drive pinions carried by the body and engaging said bull gear to supply motive power thereto,
   (i) an opening at the approximate center portion of said head; and
   (j) a door for closing said opening, said door being located within limits prescribed by the diameter of the bull gear so as to register with said central opening of the bull gear and thereby provide access to the front face of said head for maintenance of said cutting means.

8. The machine as recited in claim 7, wherein said bearing means provides front and rear sets of inner and outer races characterized in that the bearing surfaces of the front set are biased in one direction and those of the other set in the other direction from the journal axis of the head so as to provide bearing for both thrust loads and radial loads.

9. The machine as recited in claim 8, wherein said body has a through-passage leading to said central opening of the bull gear.

10. A machine for boring a tunnel of substantial diameter into a ground strata, the machine being adapted to travel progressively into the ground strata being bored as it cuts a passage therein, a head journaled for rotation on the machine having cutting means upon the front face thereof acting by rotation of the head to bore into the ground strata in which the tunnel is being formed, drive means for rotating the head, said head having a man-hole therein to provide access to said cutting means for maintenance thereof, a door by which said man-hole may be closed, and a passage-way running the length of the machine leading to said man-hole, the drive means including a bull gear fixed to the head in surrounding relation to the passage-way.

References Cited by the Examiner

UNITED STATES PATENTS

| 1,530,768 | 3/1925 | Haag | 61—45 |
| 2,837,325 | 6/1958 | Bredess | 299—31 |
| 2,955,808 | 10/1960 | Kandle | 299—31 |
| 2,988,348 | 6/1961 | Robbins | 299—31 |
| 2,998,964 | 9/1961 | Morlan | 299—80 |
| 3,041,055 | 6/1962 | Risse | 299—86 |

CHARLES E. O'CONNELL, *Primary Examiner.*

B. HERSH, *Examiner.*